United States Patent

[11] 3,579,102

[72] Inventors John F. Keating
Fanwood;
Joseph A. Zutkis, Mountainside, N.J.
[21] Appl. No. 763,690
[22] Filed Sept. 30, 1968
[45] Patented May 18, 1971
[73] Western Electric Company, Inc.,
New York, N.Y.

[54] APPARATUS FOR TESTING SUCCESSIVE ONES
OF A PLURALITY OF ELECTRICAL
COMPONENTS
2 Claims, 6 Drawing Figs.
[52] U.S. Cl. .................................................. 324/73,
209/75
[51] Int. Cl. ......................................... G01r 15/12
[50] Field of Search........................................... 324/73, 73
(AT), 158; 209/75, 81

[56] References Cited
UNITED STATES PATENTS
| | | | |
|---|---|---|---|
| 2,540,843 | 2/1951 | Stover.......................... | 324/73 |
| 3,094,212 | 6/1963 | Moore.......................... | 324/73UX |
| 3,144,939 | 8/1964 | Wahl............................ | 209/81 |
| 3,460,037 | 8/1969 | Brewer......................... | 324/158 |

Primary Examiner—Rudolph V. Rolinec
Assistant Examiner—R. J. Corcoran
Attorneys—H. J. Winegar, R. P. Miller and A. J. Nugent ABSTRACT: A turntable, having a plurality of pairs of test sockets, is moved rotatably through a load station where relays are placed in the sockets. As the turntable is moved rotatably in a first direction, each pair of relays is aligned successively with a test device, which is then locked against the turntable and connected electrically to the relays to test the relays. After a predetermined rotation of the test device with the turntable, the test device is disengaged from the turntable and is urged in a second direction to engage the next successive pair of relays.

Patented May 18, 1971

INVENTORS
J. F. KEATING
J. A. ZUTKIS
BY E. W. Somers.
ATTORNEY

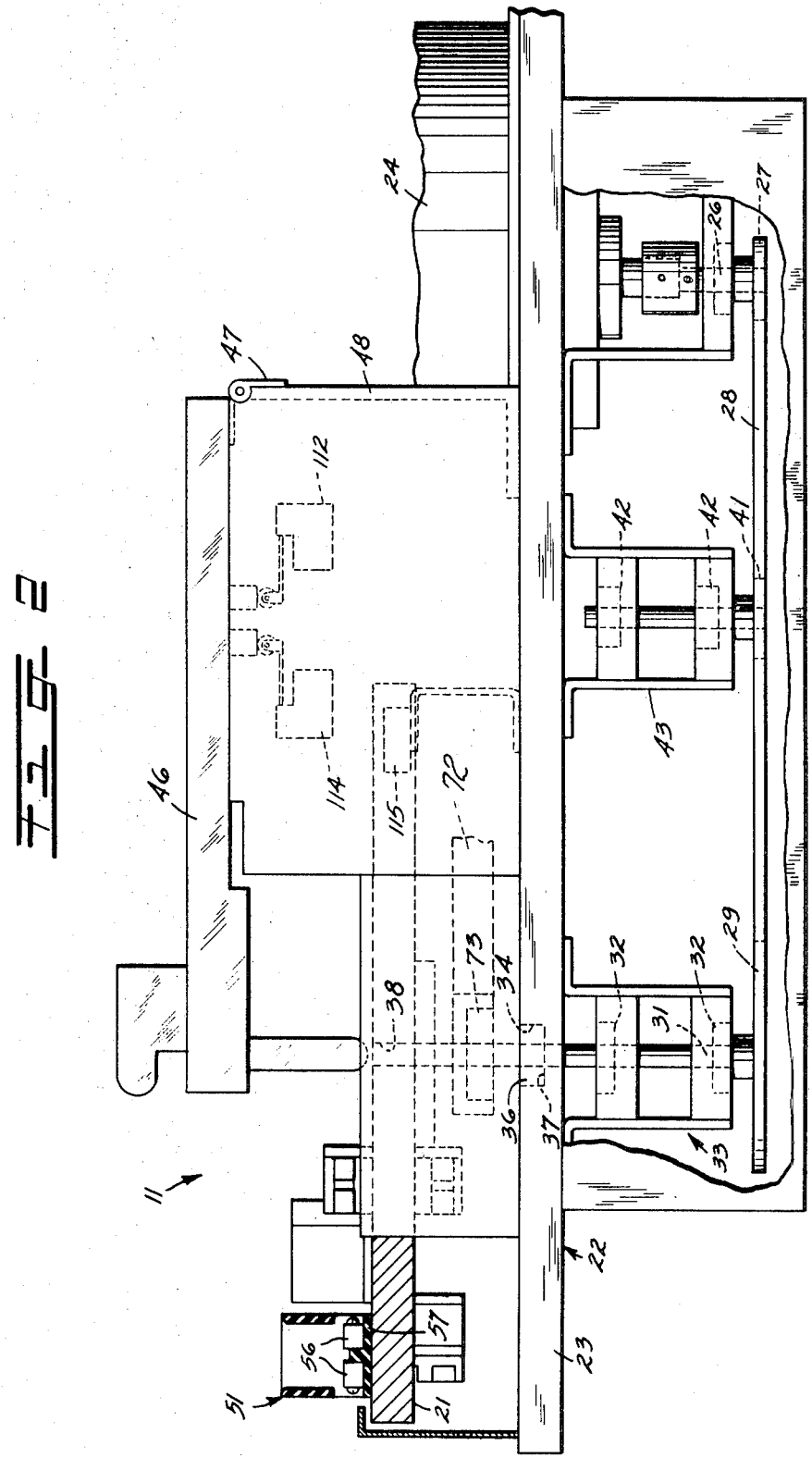

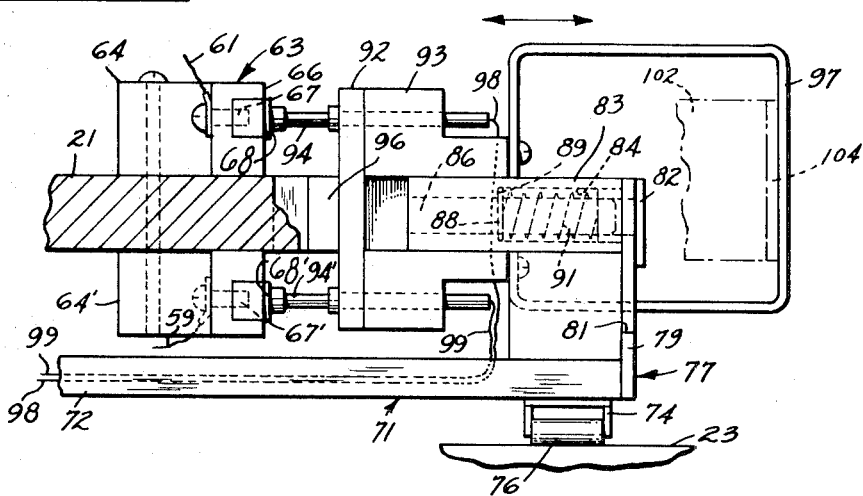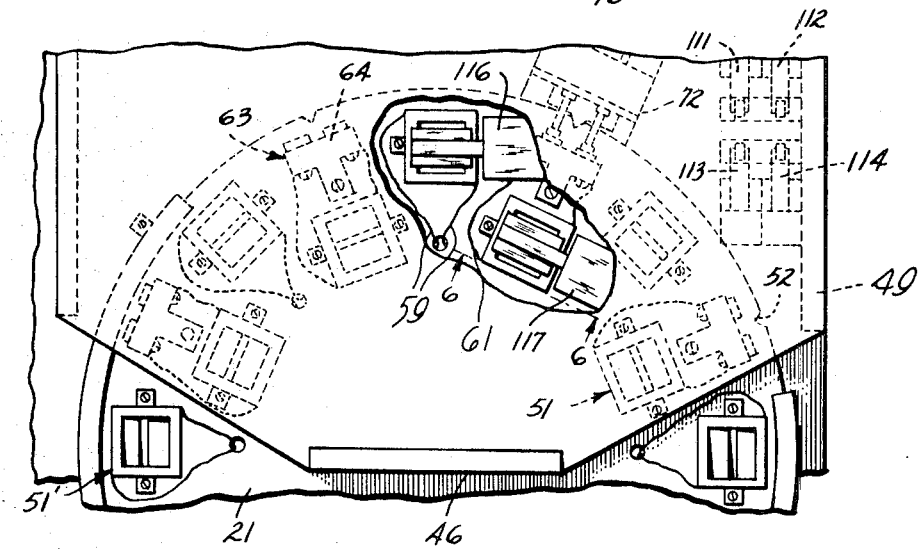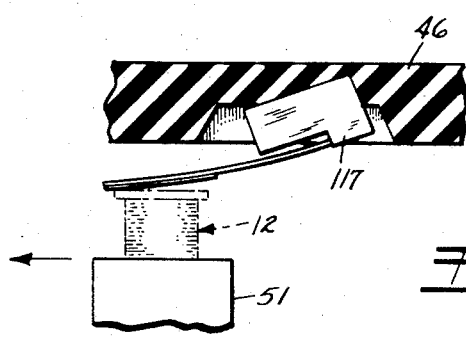

APPARATUS FOR TESTING SUCCESSIVE ONES OF A PLURALITY OF ELECTRICAL COMPONENTS

BACKGROUND OF THE INVENTION

1. Summary

This invention relates to apparatus for testing electrical components and more particularly to apparatus for testing relays mounted on a conveyor with a test device as the conveyor is moved and for disengaging the test device from the relays after the test has been completed and for then engaging the test device with the next successive relay.

2. Technical Consideration and the Prior Art

In order to determine the quality and operating characteristics of electrical components, such as relays, various electrical tests must be performed. For example, in the testing of relays, a coil of each relay must be tested for opens, shorts and arcing or voltage breakdown. This is necessary, since in the large-scale manufacture of electrical components, it is generally impracticable to make each such component so that it will have precisely a required value. Therefore, it is common practice to test these components and segregate them into groups depending on whether each component is within acceptable limits or above or below such limits.

In the past, in the surge testing of relays, a relay has been placed manually in a test socket after which a momentary surge voltage has been applied. Then an operator raises a protective cover and removes the tested relay from the test socket. As is apparent, this procedure is very time consuming and expensive.

One prior-art reference provides an apparatus in which leaded components are disposed in nests on a conveyor which continuously moves the components in a first direction through a testing device. Then a plurality of pairs of electrical clamps or jaws of a clamping device are biased into engagement with the leads of a plurality of the components. The clamping device is connected electrically to a test set and is driven independently at the same speed as the conveyor. After a predetermined length of travel, the jaws are cammed open to release the clamping device which is mounted on a carriage moved slidably in a second direction to return to an initial position with the jaws open. As the clamping device arrives at the initial position, the jaws are released to move into engagement with opposite sides of the leads for the next successive test. Although this device works well with leaded components, it is not easily adapted to other electrical components. Moreover, the carriage is driven independently of the conveyor, but at the same speed thereof, which may involve expensive mechanisms to avoid the separate movements being out of synchronization with each other.

It is therefore an object of this invention to provide apparatus for locking a test device to a conveyor successively in registration with each of a plurality of articles prepositioned on the conveyor and for then disengaging the test device from the conveyor after a predetermined movement therewith during which a test characteristic of the article is determined.

It is also an object of this invention to provide an improved apparatus for testing electrical components such as relays in which a test device is locked into a conveyor in registration with components transported by the conveyor, and which moves with the conveyor to test articles in registration therewith.

It is a further object of this invention to provide an apparatus for testing groups of articles while the group of articles is moved on a turntable through a predetermined angular rotation in a first direction after which a test device is returned in a second direction to an initial position to reengage the turntable and the next successive group of articles.

With these and other objects in mind, the present invention contemplates apparatus for testing articles, in which a plurality of articles are arranged on a conveyor and then locking a test device to the conveyor while simultaneously engaging contacts connected electrically to one of the articles to test the article while the conveyor is moved in a first direction through a predetermined distance, after which the test device is disengaged from the conveyor and urged in a second direction to engage with the next successive article.

More particularly, a plurality of groups of articles are arranged around the periphery of a turntable having spaced notches formed therein. A testing arm successively in registration with each notch engages each group of the articles to complete an electrical test circuit through the articles and tests the group of articles as the turntable is moved rotatably through a predetermined angle. After a predetermined rotation in a first direction with the turntable, the test arm is disengaged from the turntable and is urged in a second direction into engagement with the next successive notch to connect electrically with the next successive group of articles. These and other advantages will become more apparent when considered with the detailed description and the drawings.

BRIEF DESCRIPTION OF THE DRAWINGS

FIG. 2 is a view in elevation of the overall apparatus shown in FIG. 1 and taken along lines 2-2 in FIG. 1;

FIG. 4 is a detailed view of a portion of the test device which is in engagement of one of a plurality of notches on the turntable and with a pair of spaced probes on the test device in engagement with an electrical contact block on the turntable;

FIG. 5 is a plan view of a portion of the apparatus and showing the location of several limit switches which are used to prevent operation of the apparatus until a cover is lowered over the turntable and only when components occupy test sockets; and FIG. 6 is a detail sectional view in elevation and partially in section and showing one of the limit switches for ascertaining the presence of a relay in a test socket.

DETAILED DESCRIPTION

Figures 1, 3:
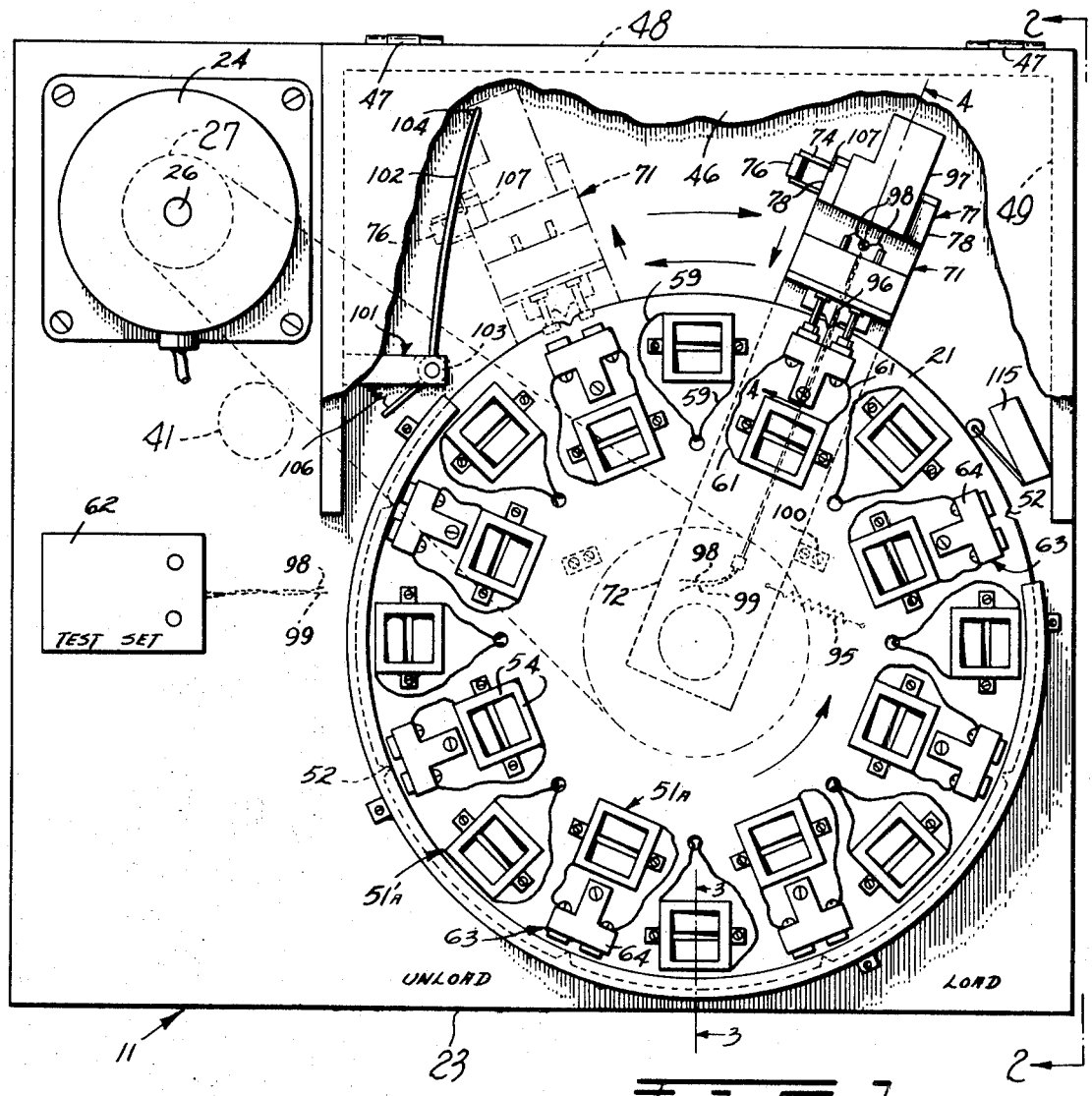
FIG. 1 is an overall plan view of an apparatus which embodies the principles of this invention for testing successive pairs of electrical components which are supported in a plurality of test sockets arrayed about the periphery of the turntable and having a test device which is mounted for rotation with the turntable.
FIG. 3 is a detailed view partially in section of one of the test sockets arrayed about the periphery of the turntable with one of the electrical components shown in the test socket for testing.

Referring now to FIGS. 1 and 2 there is shown an apparatus, designated generally by the numeral 11, for carrying out the principles of the present invention to test electrically successively each of a plurality of pairs of relays 12. (See FIG. 3).

As is best shown in FIG. 3, the electrical relay 12 includes a pair of spaced end sections 13 with a body coil portion 14 interposed therebetween. Moreover, the electrical relay 12 has a pair of leads 16 extended from one of the end sections 13.

The apparatus 11 comprises a turntable 21 having a plurality of test sockets 51 and 51' arranged in pairs about the periphery thereof. An operator loads relays 12 into the test sockets 51 and 51' at a load station and as the turntable 21 is moved rotatably in a first or counterclockwise direction, a test device 71 is locked against the turntable and in electrical engagement with a pair of the relays 12 at an initial position in a test station. The turntable 21 and the test device 71 are moved rotatably together counterclockwise through a predetermined angle during which time the pair of relays 12 are tested electrically. After the turntable 21 and test device 71 have been moved through the predetermined angle, the test device is disengaged from the turntable by an unlocking device, designated generally by the numeral 101, whereupon the test device 71 is urged pivotally in a second, or clockwise, direction and is returned through the predetermined angle to the initial position to relock against the turntable 21 and engage the next successive pair of relays 12. The relays 12 which have been tested and which are acceptable are removed from the turntable at an unloading station. The movement of the turntable 21 is stopped when a defective relay 12 is encountered and the operator removes the defective relay from the test socket 51 or 51' and restarts the operation of the apparatus 11.

SUBSTRUCTURE AND DRIVE

Referring now to FIGS. 1 and 2 there is shown an apparatus 11 for testing relays 12 which includes a turntable 21 onto which the relays 12 are loaded and subsequently moved through a test station. The turntable 21 is supported on a substructure, designated generally by the numeral 22, which includes a baseplate 23 that also supports a drive motor 24. The motor 24 has a shaft 26 which extends downwardly from the motor through an opening in the baseplate 23. A hubbed gear 27 is secured to a lower end of the shaft 26 and has a drive chain 28 mounted thereon for transmitting rotary motion from the drive motor 24 to the turntable 21.

The drive chain 28 engages the hubbed gear 27 and extends under the baseplate 23 to the center portion of the turntable 21 where the drive chain is mounted on a second hubbed gear 29. The second hubbed gear 29 is secured to a lower end of a turntable spindle 31 which is rotatably mounted in a pair of spaced bearings 32 that are supported in a mounting frame 33 that is secured to the underside of the baseplate 23. The spindle 31 extends upwardly as viewed in FIG. 2 through a stepped opening 34 in the baseplate and is press fitted in a bearing 36 that is supported on the annular surface 37 of the large-diameter portion of the stepped opening. The spindle 31 is received in an opening 38 in the turntable 21 and is secured therein to impart rotary motion from the drive chain 28 to the turntable.

Provisions are also made for adjusting the tension in the drive chain 28 by engaging the drive chain intermediate the motor 24 and the spindle 31 with a third hubbed gear 41. (See FIG. 2) The third hubbed gear 41 is rotatably mounted in a pair of spaced bearings 42 that are supported in a mounting frame 43 that is also secured to the underside of the baseplate 23. One of the bolts that is used to secure the mounting frame 43 to the underside of the baseplate 23 is turned through a slotted opening so that the mounting frame 43 may be adjustably positioned to move the third hubbed gear further against the drive chain 28 or away therefrom.

As can best be seen in FIG. 2, a portion of the turntable 21 is covered during the testing of the relays 12 by a hood 46 that is mounted pivotally by a pair of spaced hinges 47 attached to a wall 48 that is supported from the baseplate 23. The end of the hood 46 is supported by sidewalls 49 that rest on and are attached to the turntable 21.

CONVEYOR

In order to convey the relays 12 from the loading position as indicated by the work "load" in FIG. 1, into and through a test station under the hood 46, the turntable 21 has a plurality of receptacles or test sockets, designated generally by the numerals 51 and 51' spaced about the periphery of a turntable. The test sockets 51 and 51' are arranged on the turntable 21 in pairs with one test socket 51' of each pair being adjacent the peripheral edge of the turntable, and with the other 51 of each pair of test sockets spaced radially and circumferentially thereof. Consequently, the ones 51' of each pair of test sockets are arrayed along an outer circle which is concentric with the peripheral edge of the turntable 21 and slightly less in diameter than the diameter of the turntable and will hereinafter be referred to as outer test sockets; the others 51 of each pair of test sockets are arrayed around the circumference of an inner circle which is also concentric with the peripheral edge of the turntable but which is substantially less in diameter than the diameter of the turntable and will hereinafter be referred to as inner test sockets. The outer test socket 51' of each pair of test sockets is that test socket adjacent to an inner test socket when moving in a counter-clockwise direction as viewed in FIG. 1. (See test sockets 51'a and 51a, FIG. 1). Moreover, the turntable 21 has a plurality of V-shaped notches 52 formed in the peripheral edge thereof, with each of the notches aligned with the inner test socket 51 of each pair of test sockets.

Referring now to FIGS. 1 and 3, it can be seen that each of the test sockets 51 and 51' has walls 54 which are spaced to receive one of the relays 12. Each of the test sockets 51 and 51' is attached to the top surface of the turntable 21. As can be seen in FIG. 3, relays 12 are received within the test sockets 51 and 51' so that the lowermost flange 13 of the relay is adjacent the walls 54 and the leads 16 of the relay extend downwardly into engagement with a pair of spaced contact blocks 56 which are mounted on a pad 57 made of an electrically insulative material. A terminal screw 58 is secured to each of the contact blocks 56 for connecting conductor leads 59 from the contact blocks on the outer and inner sockets, respectively, to a test set designated generally by the numeral 62 (see FIG. 1).

The electrical connection between the test set 62 and the relays 12 in the test sockets 51 and 51', is made along the periphery of the turntable 21. Accordingly, there are spaced about the periphery of the turntable a plurality of turntable connector blocks, designated generally by the numerals 63, and shown best in FIGS. 1 and 4. Each of the connector blocks 63 is positioned adjacent the peripheral edge of the turntable 21 along a radial line that extends through one of the test sockets 51' in the inner ring of test sockets and one of the notches 52 on the peripheral edge of the turntable. (See FIG. 1). Also, each of the connector blocks 63 includes a pair of T-shaped units 64 and 64' with one of the T-shaped units 64 secured to the upper surface of the turntable 21 and the other T-shaped unit 64' secured to the underside of the turntable and aligned with the T-shaped unit 64. Each of the T-shaped units 64 and 64' comprises a front face block 66 which has a pair of spaced terminals 67 and 67' respectively, that extend horizontally through the front face and terminate in contacts 68 and 68' respectively, and which are made of an electrically conductive material. (See FIG. 4). The terminals 67 on the upper T-shaped unit 64 are connected through conductor wires 61 to the terminal screws 58 on the inner test socket 51, and the terminals 67' on the lower T-shaped unit 64' are connected by conductor wire 59 to the terminal screws 58 on the outer test socket 51'. In this way a test device designated generally by the numeral 71, which engages one of the notches 52 the outer peripheral edge of the turntable 21 is in alignment with one of the connector blocks 63 and with one of the inner test sockets 51. Hence, the test device 71 is simultaneously electrically connected to a pair of the relays 12 which are situated in a pair of test sockets 51 and 51' which are in registration with the test device.

TEST DEVICE

In order to test the electrical components or relays 12, the test device designated generally by the numeral 71, is included in the apparatus 11 and is mounted rotatably on the spindle 31. (See FIGS. 1, 2 and 4). More specifically, the test device 71 includes an arm 72 which is attached to a hub 73 which is mounted on the spindle 31 between the bearing 36 and the underside of the turntable 21. (See FIG. 2). The arm 72 extends radially outward from the spindle 31 under the turntable 21 past the peripheral edge of the turntable. (See FIGS. 1 and 4).

The outer end of the arm 72 has a bracket 74 extending downwardly therefrom to mount rotatably a wheel 76 (see FIGS. 1 and 4). The wheel 76 is in engagement with the baseplate 23 and rides along the top surface thereof. In this way, any tendency on the part of the cantilevered arm 72 to bind the hub 73 against the spindle 31 as the arm is rotated with the turntable is reduced or eliminated.

As can best be seen in FIGS. 1 and 4, the outer end of the arm 72 is fitted with a housing, designated generally by the numeral 77, which is secured to the arm 72 and which has a pair of spaced sideplates 78. The sideplates 78 are spanned by and connected together by a U-shaped rear plate 79 which is upstanding and which has an opening 81 formed therein. A mounting plate 82 is attached to the U-shaped plate 79 and spans the opening 81 therein.

A pair of spaced open-ended cylinders 83 are attached to and project horizontally from the mounting plate 82 of the housing 77 toward the peripheral edge of the turntable 21. (See FIG. 4). The cylinders 83 have stepped bores 84 formed therein with a rod 86 extending therethrough but stopping somewhat short of mounting plate 82. The rod 86 has a washer 88 rigidly mounted therein which is adapted to be urged against an annular surface 89 of the stepped bore 84 by a compression spring 91 which is concentrically disposed about the rod 86 in the large-diameter portion of the stepped bore. (See FIG. 4). The rod 86 is connected to a faceplate 92 of a connector block 93 which is slidably mounted over the first pair of cylinders 83.

The compression spring 92 urges the piston rod 86 and hence the connector block 93 radially inward to engage a pair of spaced probes 94 on the top of the connector block with the contacts 68 on the connector block 63 and a pair of spaced probes 94' on the bottom of the connector block 93 with the contacts 68'. (See FIG. 4). Moreover, as the spring 91 urges the connector block 93 radially inward, a detent 96 mounted on the faceplate 92 of the connector block is received in one of the notches 52 in the peripheral edge of the turntable 21 to lock the test device 71 to the turntable for rotation therewith.

Referring now to FIG. 4, it can be seen that the connector block 93 is secured to a bracket 97 having a top portion which extends over the cylinders 83 and housing 77 and a bottom portion which extends through the opening 81 in the rear plate 79 of the housing 77 and radially outward from the arm 72. In this way the connector block 93 may be moved radially outward away from the turntable 21 by urging the bracket 97 further through the opening 81 thereupon depressing the compression springs 91.

As is shown in FIG. 4, conductor wires 98 and 99 are connected to the contacts probes 94 and 94' respectively, and are then run along the underside of the test arm 72 and attached thereto at spaced locations by suitable clamp devices and carried over to the test set 62.

The test device 71 then is mounted rotatably with the turntable 21 when the detent 96 is locked into one of the notches 52 in the peripheral face of the turntable 21 under the urging of the compression springs 91. The test device 71 is moved with the turntable 21 through a predetermined angle while a test characteristic of the relays 12 is determined and until the test device is disengaged from the turntable to be returned to an initial position of the test station.

As can best be seen in FIG. 1, the test device 71 is biased in a clockwise or second direction by a tension spring 95 which is attached to the baseplate 23. It follows then that when the test device 71 is disengaged from the continuously operated turntable 21, the test device is urged clockwise by the spring 95 until the test device engages a stop 100 mounted on the baseplate 23 which signifies that the test device is in the initial position of the test station under the hood 46.

DISENGAGEMENT DEVICE

After the test device 71 has been moved through a predetermined angle measured counterclockwise, as viewed in FIG. 1, from the initial position, after which the test of a pair of relays 12 has been completed, the test device is disengaged from the turntable 21 by a disengaging device, designated generally by the numeral 101. (See FIG. 1). The disengaging device 101 includes a camming bar 102 having a sleeve end 103 which is pivotally mounted on a baseplate 23. The camming bar 102 has a curved end 104 which is dimensioned to engage with the rear portion of the strap bracket 97 as the test device 71 is moved rotatably with the turntable 21 toward the disengagement position which corresponds to the end of the test cycle.

In order to engage the curved end 104 of the camming bar 102 with the strap bracket 97 at some predetermined distance from the disengagement position, the camming bar 102 is biased in a clockwise direction as viewed in FIG. 1 by a tension spring 106. The geometrical arrangement of the camming bar 102 with respect to the test device 71 is such that when the camming bar is engaged by a resilient member 107 on a corner of the housing 77 (see FIG. 1), the curved end 104 of the camming bar engages the rear portion of the bracket 97.

LIMIT SWITCH ARRANGEMENT

A plurality of limit switches 111—118 are arranged on the apparatus 11 to render effective electrical circuits (not shown) for the operation of various parts of the apparatus when the cover 46 is closed. (See FIGS. 1, 2, 5 and 6). One limit switch 111 is mounted on the apparatus 11 and is operated when the cover 46 is moved pivotally over the turntable 21. The operation of the limit switch 111 completes an electrical circuit (not shown) to operate the drive motor 24 for moving rotatably the turntable 21.

The closing of the cover 46 also operates the limit switches 112, and 113 which completes electrical test circuits (not shown) from the test set 62 through the conductors 98 and 99 and 61 and 59 to the test sockets 51 and 51' for the inner and outer ring respectively, and the limit switch 114 which acts as an interlock for a control panel (not shown).

The stop 100 is positioned on the baseplate 23 so that when the test device 71 has been urged by the tension spring 95 into engagement with the stop and the detent 96 has engaged one of the notches 52, the next successive notch is spaced clockwise, as viewed in FIG. 1, from a limit switch 115. As the test device 71 is moved counterclockwise with the turntable 21, the limit switch 115 engages the next successive notch and is operated to complete an electrical circuit (not shown) to the test set 62 to begin the test to determine test characteristics of the relays 12 in the pair of test sockets 51.

Provisions are also made in the apparatus 11 for determining when there is no relay 12 in the test sockets 51 and 51' in the test position. This condition may occur because of an operator inadvertently failing to place a relay 12 in one of the nests or because the attention of the operator may be momentarily diverted. In order to detect the presence of a relay 12 in the sockets 51 and 51' in the inner and outer ring of test sockets, limit switches 116 and 117 are attached to the underside of the cover 46 and aligned with the path of travel of the outer and inner nests respectively. (See FIGS. 5 and 6). The limit switches 116 and 117 are arranged so that trip fingers extending downwardly therefrom are engaged by relays 12 just prior to the start of the test. Should a test socket 51 and 51' not contain a relay 12, the limit switch 116 or 117 is not operated and the test circuit (not shown) for that nest is not completed.

Finally, there is the limit switch 118 which is attached to the underside of the cover 46 and which is a safety interlock switch. When the cover 46 is lifted, the limit switch 118 interrupts an electrical circuit (not shown) to the motor 24 and to the test set 62 thereupon interrupting operation of the apparatus 11 until the cover is replaced back over the turntable 21.

OPERATION

In the operation of the apparatus 11, an operator swings the cover 46 to a closed position over the turntable 21 to render effective electrical circuits (not shown) to the drive motor 24 and to the test set 62. Then the operator loads successively relays 12 alternately into the test sockets 51 and 51' in the inner and outer rings of test sockets respectively.

As the turntable 21 is driven rotatably in the first or counterclockwise direction by the motor 24, the turntable is moved into the initial position with one of the notches 52 in the peripheral face of the turntable in registration with the detent 96 on the test device 71. The compression springs 91 in the cylinders 83 urge the connector block 93 radially inward toward the turntable 21 to engage the probes 94 and 94' with the contacts 68 and 68' respectively, to complete an electrical circuit through the relays 12 and the conductor wires 61 and 59 through the probes and conductor wires 98 and 99 to the test set 62.

The turntable 21 is moved rotatably a slight distance with the test device 71 locked against the edge thereof and rolling on the top surface of the baseplate 23 until the relays 12 engage and trip the limit switches 116 and 117 signifying that relays are present in the test sockets and renders operable an electrical circuit (not shown) to the test set 62. Then, as the next successive notch 52 is moved past the limit switch 115, the limit switch 115 is actuated to operate the test set 62. The turntable 21 is moved rotatably in the first direction through a predetermined angle and a test characteristic for each of the two relays 12 under test is determined. Should either of the two relays 12 under test be nonacceptable, the drive motor 24 is deenergized and the turntable 21 is stopped. Appropriate signals are indicated on the control panel (not shown) to indicate to the operator which of the relays 12 is defective. The operator raises pivotally the cover 46 and removes the defective relay. Then the operator replaces the cover 46 and actuates a start button (not shown) on control panel (not shown) and the rotary motion of the turntable is resumed.

As the test device 71 approaches the disengagement position, the camming bar 102 engages the resilient member 107 mounted on an outer end of the arm 111 (see FIG. 1), and the curved end 104 is thrust into the space between the rear plate 79 of the housing 77 and the bracket 97. Continued rotation of the turntable 21 and the test device 71 urges the camming bar 102 in a counterclockwise direction as viewed in FIG. 1 whereupon the curved end 104 exerts a radially directed force outward away from the turntable. The camming bar 102 overcomes the inwardly directed forces of the spring 106 and urges the detent 96 out of the notch 52 in the turntable.

Once the test device 71 has been disengaged mechanically from the turntable 21, and the probes 94 and 94' have been disengaged from the contacts 68 and 68' respectively, the spring 95 is rendered effective to urge pivotally the arm 72 in a second or clockwise direction until the test device engages the stop 100. Moreover, the spring 106 urges the camming bar 102, now free of the test device 71, in a clockwise direction to await the approach of the test device in the next cycle of testing. When the test device 71 engages the stop 100, the next successive notch 52 in the peripheral edge of the turntable and the connector block 63 are in registration with the test device whereupon the springs 91 in the cylinders 83 urge the detect 96 into the next successive notch and the cycle is repeated.

It is to be understood that the above-described embodiments are simply illustrative of the invention and that many other embodiments can be devised without departing from the scope and spirit of the invention.

We claim:

1. In an apparatus for testing components with a test set;
    a turntable having a plurality of notches formed in a peripheral edge thereof;
    means mounting said turntable for rotary movement in a first direction;
    a plurality of pairs of workholders mounted on said turntable adjacent said peripheral edge, with one workholder of each pair of workholders aligned with one of said notches in said turntable, each of said workholders adapted to receive one of said components;
    a test arm extending radially of the turntable past the peripheral edge thereof;
    means for mounting rotatably said test arm;
    contacts on each of said workholders for establishing electrical connections with the one of said components received in said workholder;
    a plurality of connector blocks mounted on said turntable, each of said connector blocks aligned with one of said notches and having terminals connected electrically with the contacts on each of said pair of workholders associated with the one of said notches;
    probe means extending radially inward from said test arm and connected to said test set for engaging said terminals on each successive one of said connector blocks to connect electrically each successive pair of said components to said test set;
    latching means mounted on an outer end of said arm and movable radially thereof relative to said arm into one of the notches for locking said arm to said turntable to rotate therewith;
    means for biasing said probe means and said latching means radially inward to lock the arm to the turntable and to engage said probe means with said terminals of said associated connector block;
    means for urging said test arm to rotate in a second direction opposite to said first direction; and
    camming means for unlocking said latching means from said turntable after a predetermined rotation in said first direction to permit said urging means to move said test arm in said second direction to lock into the next successive notch.

2. An apparatus for testing components with a test set, which comprises:
    a turntable for transporting spaced components to be tested through a predetermined distance and having a plurality of spaced notches cut in a peripheral edge thereof;
    means for mounting rotatably the turntable;
    a plurality of pairs of test sockets mounted on said turntable, each of the test sockets adapted to receive one of the components, each pair of test sockets associated with one of said notches;
    a connector block associated with each pair of test sockets and mounted on the turntable, each of the connector blocks aligned with the associated notch and having one portion thereof mounted on one flat surface of the turntable and another portion thereof mounted on the other flat surface of the turntable;
    a rotatably mounted test arm extending radially of the turntable and extending past the peripheral edge thereof, the test arm having a detent formed thereon and being received in successive ones of the notches for locking the arm to the turntable in alignment with successive ones of the connector blocks;
    spaced contacts on each portion of each connector block projecting radially outward from the turntable, the spaced contacts on the one portion being connected to one of the associated pair of test sockets and with the spaced contacts on the other portion being connected to the other test socket of the associated pair of test sockets;
    a test fixture mounted on the test arm for reciprocal movement along a path radial of the turntable;
    means for urging the test fixture toward the turntable to move the detent into one of the notches at one end of said predetermined distance and engage the test fixture with the contacts on the one of the connector blocks;
    camming means positioned in the path of movement of the test arm at the other end of the predetermined distance for overcoming the urging means to move the test fixture out of engagement with the contacts and to disengage the detent from the notch;
    means rendered effective when the detent is disengaged from each successive one of the notches for returning the test arm to the one end of the predetermined distance to permit the urging means to move the detent into the next successive notch and to engage the test fixture with the contacts of the connector block associated with the next successive notch and associated pair of test sockets;
    means for moving the turntable to advance each successive pair of the components and the test arm through the predetermined distance;
    means responsive to the movement of the test arm from the one end of the predetermined distance with the detent in engagement with one of the notches for detecting the next successive notch; and
    means rendered effective by the detecting means for testing the components in the test sockets connected to the connector block associated with the notch being engaged by the detent.